(12) United States Patent
Eicher et al.

(10) Patent No.: US 10,521,730 B1
(45) Date of Patent: Dec. 31, 2019

(54) COMPUTING INSTANCE LAUNCH WORKFLOW (71) Applicant: Amazon Technologies, Inc., Reno, NV (US)

(72) Inventors: Anton André Eicher, Cape Town (ZA); Matthew James Eddey, Seattle, WA (US); Richard Alan Hamman, Cape Town (ZA)

(73) Assignee: Amazon Technoiogies. Inc., Seattle, WA (US)

( * ) Notice: Subject to any disclaimer, the term of this patent is extended or adjusted under 35 U.S.C. 154(b) by 1268 days.

(21) Appl. No.: 14/482,926

(22) Filed: Sep. 10, 2014

(51) Int. Cl.
*G06N 20/00* (2019.01)
*G06F 9/48* (2006.01)

(52) U.S. Cl.
CPC .............. *G06N 20/00* (2019.01); *G06F 9/48* (2013.01)

(58) Field of Classification Search
None
See application file for complete search history.

(56) References Cited

U.S. PATENT DOCUMENTS

| | | | | |
|---|---|---|---|---|
| 5,930,780 A | * | 7/1999 | Hughes | G06N 3/126 706/10 |
| 2012/0110055 A1 | * | 5/2012 | Van Biljon | G06Q 30/04 709/201 |
| 2012/0151062 A1 | * | 6/2012 | Gusev | G06F 9/5011 709/226 |
| 2013/0030859 A1 | * | 1/2013 | Jung | G06Q 10/103 705/7.26 |
| 2015/0205637 A1 | * | 7/2015 | Lee | G06F 9/505 718/105 |

OTHER PUBLICATIONS

Kousiouris et al., The effects of scheduling, workload type and consolidation scenarios on virtual machine performance and their prediction through optimized artificial neural networks, The Journal of Systems and Software 84:1270-1291, 2011.*

* cited by examiner

*Primary Examiner* — Kakali Chaki
*Assistant Examiner* — Michael Zidanic
(74) *Attorney, Agent, or Firm* — Thorpe North & Western, LLP.

(57) ABSTRACT

A technology is described for determining a launch workflow for launching multiple computing instances on a physical host in a computing service environment using a predicted launch time. An example method may include receiving a launch plan to launch a plurality of computing instances on a physical host within a computing service environment. A first launch workflow and a second launch workflow may then be determined for the launch plan where the first launch workflow and the second launch workflow may specify different sequences of operations performed to launch the computing instance on the physical host. Predicted launch times for the first launch workflow and the second launch workflow may be obtained and the predicted launch times may be compared to determine a launch workflow used in executing the launch plan.

19 Claims, 7 Drawing Sheets

COMPUTING INSTANCE LAUNCH WORKFLOW

BACKGROUND

The advent of virtualization technologies for computing resources has provided benefits with respect to managing large-scale computing resources for many customers with diverse needs and has allowed various computing resources or computing services to be efficiently and securely shared by multiple customers. For example, virtualization technologies may allow a single physical computing machine to be shared among multiple customers by providing customers with one or more computing instances hosted by the single physical computing machine using a hypervisor. Each computing instance may be a guest machine acting as a distinct logical computing system that provides a customer with the perception that the customer is the sole operator and administrator of a given virtualized hardware computing resource.

Launching one or more computing instances on a single physical computing machine may entail identifying available computing resources (e.g., physical hosts) on which a computing instance may be loaded and executed. A time to load and launch a computing instance on a single physical computing machine may vary due to various aspects of the computing environment containing the single physical computing machine and aspects of the computing instance being launched. As a result, a launch time for a computing instance may range from a few minutes to many minutes.

DETAILED DESCRIPTION

A technology is described for determining a launch workflow used to launch a number of computing instances on a physical host. A predicted launch time for launching a computing instance on a physical host may be used to identify or select the launch workflow. In one example of the technology, in response to a launch request specifying a launch of two or more computing instances, a launch plan may be generated. A launch workflow used to launch the computing instances may then be determined. As a specific example, a launch workflow determination may be made whether to select a launch workflow that launches the computing instances in parallel on a physical host or to select a launch workflow that sequentially launches the computing instances on the physical host (e.g., stack the computing instance launches so that as one computing instance launch ends another computing instance launch begins). As referred to in this disclosure, a computing instance may be a virtual machine (e.g., an instance of a software implementation of a computer) that executes software applications like a physical machine. A physical host may be a server computer that executes multiple computing instances by way of an instance manager (e.g., a specialized hypervisor).

In determining a launch workflow, a predicted launch time (e.g., a predicted time to launch a computing instance on a physical host within a computing service) may be obtained for computing instances in the launch workflows and the predicted launch times may be compared to determine which launch workflow results in the lowest overall predicted launch time. For example, a machine learning model may be used to generate a predicted launch time using launch features that represent parameters associated with launching a computing instance on a physical host. Included in the launch features may be launch features representing a launch workflow (e.g., features associated with launching computing instances in parallel or sequentially). A predicted launch time representing a parallel launch may then be compared to a predicted launch time representing a sequential launch.

A launch time for a computing instance, in one example, may include executing service calls to setup computing instance resources (e.g., storage and network interfaces), selecting a physical host for the computing instance and creating the computing instance on the physical host. In particular, launching multiple computing instances at or near the same time may result in co-location of computing instance launches on single physical hosts. As a specific example, a launch plan may specify that twenty computing instances be launched where a computing service may have just five physical hosts available to host the twenty computing instances, resulting in co-location of many of the computing instance launches due to high number of computing instance launches (i.e., twenty) compared to the low number of available physical hosts (i.e., five). Co-location of computing instance launches may increase launch times depending upon a launch workflow selected to launch the computing instances. For example, co-location may cause a launch time to exceed an SLA (Service Level Agreement) time with a customer. As a result of this technology, predicted launch times may be obtained for various launch workflows that may be used to launch computing instances on a single physical host and a launch workflow associated with the lowest predicted launch time may be selected to launch the computing instances.

Figure 1:
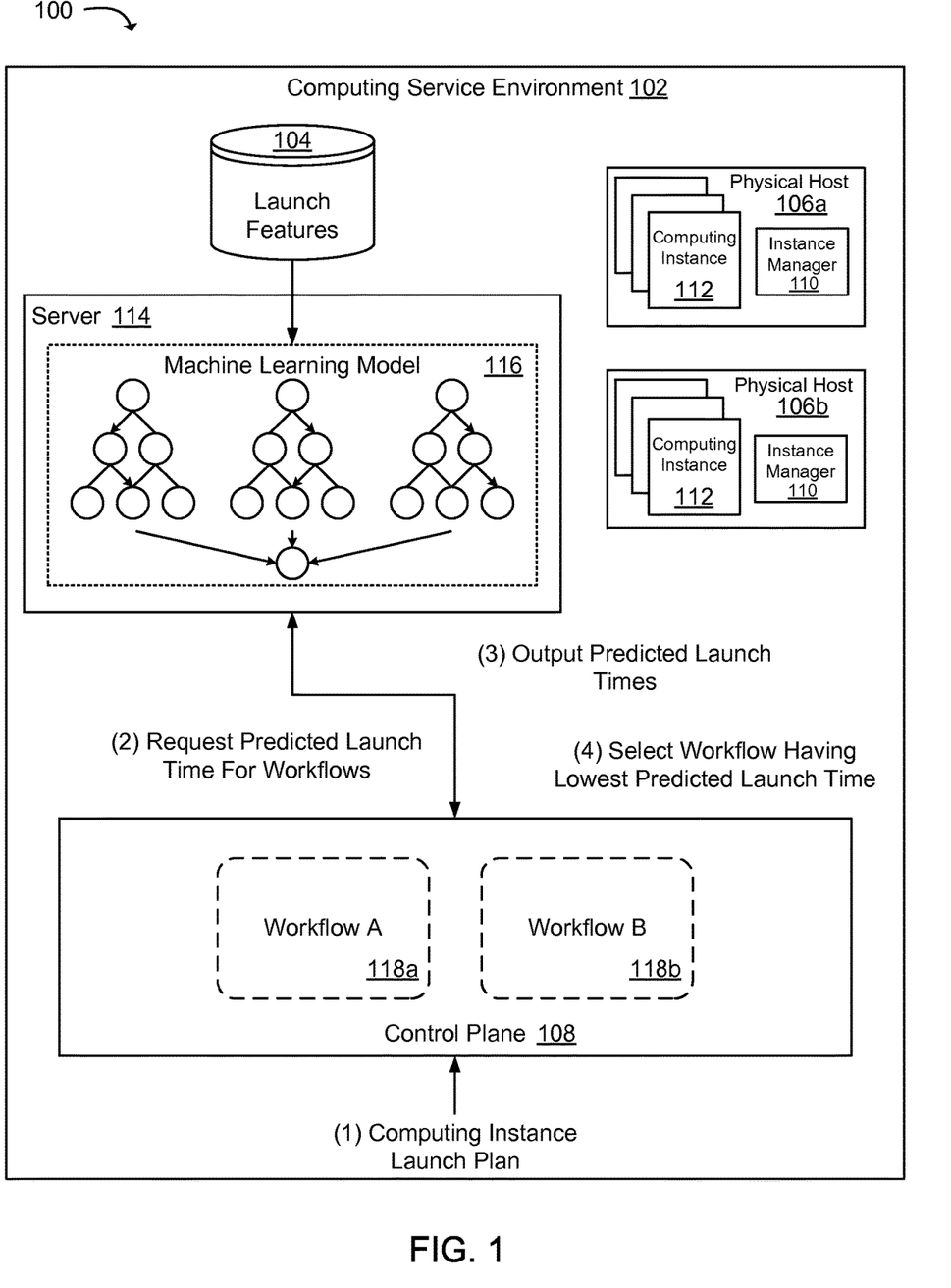
FIG. 1 is a diagram illustrating an example system and method for determining a launch workflow used to launch multiple computing instances on a physical host.

FIG. 1 is a diagram illustrating a high level example of a system 100 that may be used to determine a launch workflow used to launch multiple computing instances 112 on a physical host 106a-b included in a computing service environment 102. The computing service environment 102 may include a number of physical hosts 106a-b capable of executing computing instances 112 via an instance manager 110, and a server 114 that provides predicted launch times for launching computing instances 112 on the physical hosts 106a-b by way of a machine learning model 116.

In one example configuration, a computing instance launch plan (1) may be sent to a control plane 108 of a computing service requesting a launch of two or more computing instances 112. For example, a customer may request that a batch of computing instances 112 be launched (e.g., tens, hundreds or thousands of computing instances). Upon receiving the launch plan, among other actions, a determination of a number of physical hosts 106a-b available to host the computing instances 112 may be made. In one example, launches for the computing instances 112 may be divided among the available physical hosts 106a-b. Based on a number of physical hosts 106a-b available to host computing instances 112, some physical hosts 106a-b may be assigned multiple computing instance launches.

Having determined whether computing instance launches may be co-located on a physical host 106a-b, as illustrated in FIG. 1, various launch workflows 118a-b that may be used to launch the co-located computing instances 112 may then be identified. The launch workflows 118a-b may specify sequences of operations for launching the computing instances 112. For example, a first launch workflow 118a may specify launching computing instances 112 (e.g., a first computing instance and a second computing instance) in parallel on a physical host 106a-b (e.g., the first computing instance and the second computing instance may be launched at the same time). A second launch workflow 118b may specify launching computing instances 112 sequentially, resulting in executing a first launch for a first computing instance and queuing a second launch for a second computing instance in a launch queue. After the first launch has finished, the second launch may be executed. In addition, the launch workflows 118a-b may specify sequences of operations for obtaining and connecting resources to a computing instance 112 (e.g., downloading and unbundling machine images, setting up and connecting to network attached volumes, setting up firewall rules and connecting virtual network interfaces).

The control plane 108 may then make requests (2) for predicted launch times associated with the launch workflows 118a-b to the server 114 hosting the machine learning model 116 (e.g., a machine learning regression model). A predicted launch time may be the time between receiving a launch plan (e.g., a computing instance state is "pending") and the start of booting the computing instance (e.g., the computing instance state is "running"). Included in a predicted launch time request may be information associated with a launch workflow 118a-b. For example, the launch workflow information may identify whether the launch workflow 118a-b specifies a parallel launch on a physical host, a sequential launch, a divided batch launch, a distributed launch on separate physical hosts, etc.

In one example, the launch workflow information may be included in a launch configuration for a launch plan. A launch configuration may include specifications of the launch plan, such as a specified launch workflow 118a-b for launching the computing instances as provided by a customer, machine image(s) used to create the computing instances, a physical host 106a-b selected to host the computing instances 112, storage devices or data stores for the computing instance, network types, a geographic region of a data center housing the physical host, etc. The launch configuration may be provided to the server 114 executing the machine learning model 116. The information included in the launch configuration (i.e., including the launch workflow information) may be aligned with launch features 104 that have been determined to impact a launch time. More specifically, data for the launch features 104 may be obtained from the launch configuration and from other data sources and the data may be provided to the machine learning model 116. The machine learning model 116 may then (3) output a predicted launch time representing an expected time to launch the computing instances 112 using the launch workflow 118a-b specified in the launch configuration.

A predicted launch time may be obtained for each launch workflow 118a-b (e.g., a predicted launch time for launching a computing instance using a launch workflow 118a-b) and the predicted launch times may be compared to determine a launch workflow 118a-b that will be used to execute the launch plan. For example, a first launch workflow 118a may be compared with a second launch workflow 118b and (4) the launch workflow 118a-b associated with the lowest predicted launch time may be selected.

In another example, in determining a launch workflow 118a-b to use for a launch plan, a target launch time associated with the launch plan may be identified and a launch workflow 118a-b associated with a predicted launch time that is less than the target launch time may be selected. For example, a target launch time may be an SLA launch time that a computing service provider has agreed to provide as part of a service contract for launching a computing instance 112 or a computing instance batch. As such, a computing service provider may wish to avoid a breach of an SLA launch time by programmatically selecting a launch workflow 118a-b that results in a launch time that is less than the SLA launch time for either a computing instance, a launch batch or a launch workflow.

As an illustration, predicted launch times for a launch plan may be obtained for a first launch workflow 118a and a second launch workflow 118b. A target launch time for the launch plan may then be retrieved and the target launch time may be compared to the predicted launch times and the predicted launch time that is less than the target launch time may be selected. Illustratively, in a case where both predicted launch times may be less that the target launch time, then the lowest predicted launch time may be selected.

In another example, a launch plan may be placed in a priority launch queue as a result of a predicted launch time associated with one or more launch workflows 118a-b being greater than a target launch time. For example, a target launch time for a launch plan may be identified and the target launch time may be compared to predicted launch times associated with launch workflows 118a-b. In a case where comparing the predicted launch times with the target launch time results in the predicted launch times being greater than the target launch time (i.e., the predicted launch times are likely to breach the target launch time), the launch plan may be placed in a priority launch queue as a result of the predicted launch time for the launch workflows 118a-b being greater than the target launch time. Illustratively, a priority launch queue may be used to place a launch plan ahead of other pending launch plans. Placing the launch plan in the priority queue may result in a launch time that does not breach the target launch time.

Figure 2:
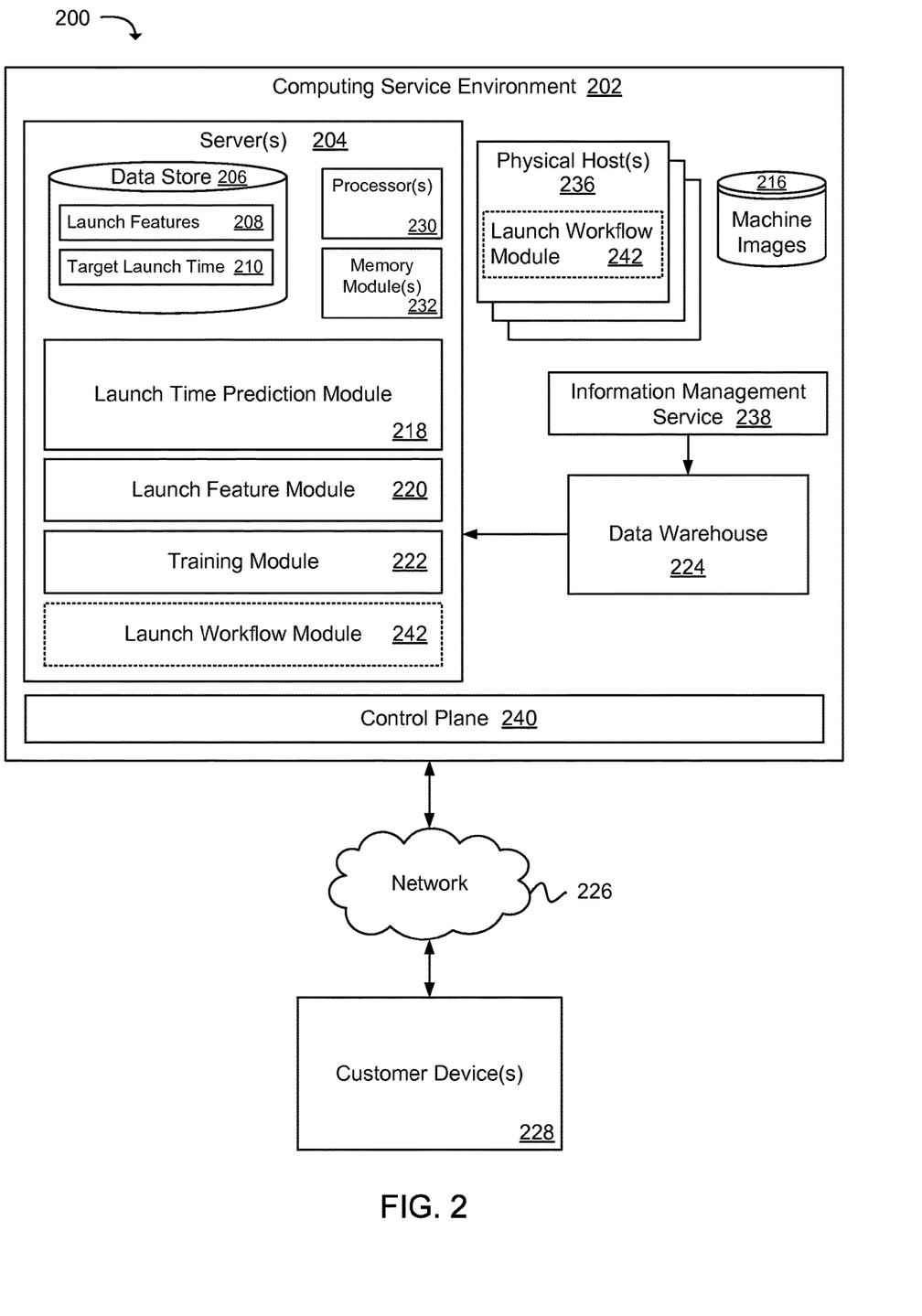
FIG. 2 is a block diagram that illustrates various example components included in a system for determining a launch workflow for launching multiple computing instances within a computing service environment.

FIG. 2 illustrates components of an example system 200 on which the present technology may be executed. The system 200 may include a computing service environment 202 that may be accessible to a number of customer devices 228 via a network 226. The computing service environment 202 may provide customers with network accessible services, such as computing instances that execute on physical hosts 236. Included in the computing service environment 202 may be a server 204 that hosts a launch time prediction module 218 that may be used to generate predicted launch times for computing instances launched on the physical hosts 236 and/or launch workflows. In addition to the launch time prediction module 218, the server 204 may contain a training module 222, a launch feature module 220, a launch workflow module 242 and one or more data stores 206 having data that may be accessible to the modules contained on the server 204.

In one example configuration, the launch workflow module 242 may be configured to evaluate a launch workflow assigned to a computing instance launch plan or launch workflow included as part of a launch plan by obtaining a predicted launch time for a computing instance launch (or computing instance launches) that uses the launch workflow and determine whether a lower predicted launch time may be achieved by selecting an alternative launch workflow. A launch workflow assigned to a computing instance launch may specify a sequence of operations for launching two or more computing instances on a physical host 236.

Illustratively, various aspects of launching multiple computing instances on a physical host 236 may affect a launch time for the computing instances. As one specific example, a hypervisor may be configured to communicate with a single process used to launch a computing instance at one time. Therefore, processing multiple computing instance launches on a physical host 236 may result in multiple launch processes competing against one another for the hypervisor, resulting in an increased launch time as compared to launching a single computing instance on the physical host 236. As another specific example, in a case where a machine image used to create a computing instance may be stored on a remote network data store, retrieving the machine image from the remote network data store may result in an I/O (Input and Output) intensive process. Thus, when launching multiple computing instances that may be created using machine images stored on remote network data stores, a processing load placed on a hypervisor may be substantially increased when launching the computing instances in parallel, resulting in an increased launch time for the multiple computing instances.

As another specific example, where resources used to launch multiple computing instances may be stored locally on a physical host 236, launching the multiple computing instances in parallel may, in some cases, result in a faster launch time as compared to launching the computing instances sequentially. As in the example above, machine images used to create the computing instances may be stored or cached on a physical host 236 selected to host the computing instances, and therefore, an I/O processing load placed on a hypervisor may not result in a longer launch time.

As yet another specific example, in a case where a batch computing instance launch may be assigned to a single physical host 236, launching every computing instance included in the batch may result in a longer launch time as compared to dividing the batch computing instance launch into multiple smaller batches and launch the smaller batches one at a time (e.g., as one batch finishes, launch another batch).

The launch workflow module 242 may be located on a server 204, on a physical host 236, or may be located anywhere within a processing stack (e.g., control plane 240) where physical host placement decisions of computing instances may be made. In one example configuration, the launch workflow module 242 may be located on the server 204. In determining a launch workflow within the processing stack, the launch workflow module 242 may be used to determine elements of a workflow that may include whether to launch computing instances serially or in parallel and/or when and in what order to make preparatory calls to other services that prepare resources used by a computing instance. For example, a preparatory call may be made to a storage service that allocates storage for use by a computing instance, and a call may be made to a network interface service that generates a virtual network interface that may be attached to the computing instance. Upon receiving a launch plan for two or more computing instances, the control plane 240 for the computing service environment 202 may be configured to determine a launch configuration that includes the selection of a launch workflow by requesting a launch workflow for the launch plan from the server 204. The launch workflow request may be sent to the launch workflow module 242 located on the server 204. The launch workflow module 242 may determine a launch workflow for the launch plan by obtaining predicted launch times associated with possible launch workflows via the launch time prediction module 218. For example, a predicted launch time may be obtained for a first launch workflow and a predicted launch time may be obtained for a second launch workflow and a launch workflow (e.g., either the first launch workflow or the second launch workflow) associated with the lowest predicted launch time may be selected. A predicted launch time for a workflow may be the sum of predicted launch times for the computing instances included in the launch plan or the sum of predicted launch times for computing instances included in a launch workflow.

In another example configuration, the launch workflow module 242 may be located on a physical host 236. In determining a launch workflow on the physical host using the workflow module 242, in addition to determining whether to launch computing instances serially or in parallel, elements of a workflow may include a determination of when and in what order to make calls to services that have prepared resources to attach to a computing instance. For example, a determination of when to make calls to a storage service that has prepared a storage volume and requesting that the storage volume be attached to the physical host, or when to request that a virtual network interface be attached to a computing instance. Upon receiving instructions to launch a number of computing instances in relation to a launch plan that includes a first launch workflow, the launch workflow module 242 may be configured to obtain a predicted launch time for a computing instance launch associated with the first launch workflow specified in the launch plan, and a predicted launch time for a computing instance launch associated with a second alternative launch workflow. The predicted launch times may be obtained from the launch time prediction module 218 located on the server 204. After receiving the predicted launch times, the launch workflow module 242 may be configured to select the launch workflow (e.g., the first launch workflow or the second alternative launch workflow) associated with a computing instance launch having the lowest predicted launch time.

In some examples, predicted launch times for computing instance launches associated with a launch workflow may be compared to an target launch time to determine whether the target launch time is likely to be breached or not. Illustratively, the launch workflow module 242, located on the server 204 or on a physical host 236, may be configured to retrieve a target launch time 210 from a data store 206 and compare the target launch time 210 to predicted launch times associated with various launch workflows. A launch workflow associated with a predicted launch time that may be less than the target launch time may then be selected.

In one example configuration, the launch time prediction module 218 may be configured to generate predicted launch times for computing instances placed on physical hosts 236 located within a particular computing service environment 202. For example, as illustrated in FIG. 2, the launch time prediction module 218 may be executed within the computing service environment 202 and may provide predicted launch times for computing instances launched in the computing service environment 202. In another example configuration, the launch time prediction module 218 may be external to any computing services and may receive requests for predicted launch times from any number of computing services by way of a network.

Examples of machine learning models that may be used to predict a launch time may include regression models, such as a random forest model, extremely randomized trees model, an AdaBoost model, a stochastic gradient descent model, a support vector machine model, as well as other types of machine learning models not specifically mentioned here.

A training module 222 may be configured to obtain features from various data sources that are then used to train the launch time prediction module 218. In one example, feature data may be retrieved from a data warehouse 224. The feature data may be launch metrics from previous computing instance launches within the computing service environment 202 that have been stored to the data warehouse 224. Illustratively, an information management service 238 may push (e.g., upload) launch related data to the data warehouse 224 making the data accessible to the training module 222. Data retrieved from the data warehouse 224 may be recent data (e.g., seconds, minutes or hours old) or historical data (e.g., days, weeks or months old) associated with computing instance launches.

Feature data retrieved from the data warehouse 224 may correlate with launch features 208 determined to have an impact on a launch time of a computing instance. Illustratively, analysis may be performed to determine which launch features 208 impact a launch time and a query may then be constructed that selects feature data for the launch features 208 from the data warehouse 224. In some examples, feature data for the launch features 208 may be processed when the feature data may be large or redundant. For example, feature data may be processed into a reduced representation set of launch features (e.g., features vector). Having obtained the launch features 208, the launch time prediction module 218 may then be trained using the launch features 208.

The launch time prediction module 218 may be initially trained using historical data and then placed in production where the launch time prediction module 218 may provide a predicted launch time according to an on demand basis. The training module 222 may be configured to obtain historical data for launch features 208 from a data warehouse 224 and provide the historical data to the launch time prediction module 218. The historical data may be used to initially train the launch time prediction module 218. Subsequent training of the launch time prediction module 218 may be performed by taking the launch time prediction module 218 out of production (e.g., offline) and training the launch time prediction module 218 using historical data (e.g., data from the previous day, week, month, etc.). Alternatively, subsequent training may be performed while the launch time prediction module 218 is in production (e.g., online) using recent data (e.g., data from the previous minutes, hours, day, etc.).

The launch feature module 220 may be configured to obtain launch features 208 associated with a request for a predicted launch time (e.g., a predicted launch time received via the launch workflow module 242). The launch features 208 obtained may then be provided as input to the launch time prediction module 218. As an illustration, a request to launch a computing instance (e.g., via a customer device 228) may be received by the control plane 240. The launch request may be for a number of computing instances (e.g., tens, hundreds or thousands of computing instances). Upon receiving the launch request, a launch plan may be determined for the launch request that specifies, among other things, launch workflow features, machine image features, physical host features, various computing instance attachment features (e.g., network, storage, etc.) and customer configuration features (e.g., storage devices, network types, geographic region, etc.). The launch plan (or a reference to the launch plan) may then be included in a request for a predicted launch time.

Upon the launch time prediction module 218 receiving a request for a predicted launch time, the launch configuration may be provided to the launch feature module 220, whereupon the launch configuration may be evaluated and data for launch features 208 corresponding to the launch configuration may be collected. As an example, the launch configuration may be evaluated to determine launch specifications that may include a launch workflow. For example, whether computing instances will be launched in parallel or sequentially.

Based on the specifications of the launch configuration, data for launch features 208 may then be obtained. For example, data for launch features 208 associated with the launch workflow may be obtained (number of computing instances to be launched in parallel or sequentially), data for launch features 208 associated with the machine image 216 may be obtained (operating system and virtualization type), data for launch features 208 associated with the storage and network devices 234 may be obtained (storage type, network type, etc.) and data for launch features 208 associated with the physical host 236 may be obtained (contending instances, running instances, host architecture, geographical zone, etc.).

Data collected for the launch features 208 may then be provided to the launch time prediction module 218 as input. The launch time prediction module 218 may then generate a predicted launch time via a method that determines a predicted launch time by evaluating the launch features 208 provided to the machine learning model. As one example, the launch time prediction module 218 may comprise a number of decision trees where launch features 208 are input into the decision trees and using regression, a predicted launch time is calculated from the output of the decision trees. The predicted launch time generated by the launch time prediction module 218 may then be used to determine a launch workflow that results in the lowest predicted launch time.

A physical host 236 included in the system 200 may be a server computer configured to execute an instance manager (i.e., a hypervisor, virtual machine monitor (VMM), or another type of program) that manages multiple computing instances on a single physical host 236. The physical hosts 236 may be located in data centers within various geographical regions. As a result, launch times for computing instances may be influenced based on the geographical region of a physical host 236 selected to host a computing instance. Also, a launch time may be influenced by other attributes of a physical host 236, such as architecture, brand, etc.

A machine image 216 may be a pre-configured virtual machine image (e.g., a virtual appliance) that may be executed by an instance manager. A machine image 216 may include information and a template for launching a computing instance that may include an operating system, an application server and various applications, any of which may influence a launch time of a computing instance. Further the machine image 216 may include mappings to storage volumes that attach to a corresponding computing instance when the computing instance is launched. Illustratively, machine images 216 may be stored in block level storage volumes or in a network file storage service. The storage location of a machine image 216 may influence a launch time of a computing instance. For example, when storing a machine image 216 in a network file storage service, the machine image 216 may be compressed in order to facilitate transferring of the machine image 216 over a network. As a result, after transferring the machine image 216 to a physical host 236 selected to host a computing instance, decompressing the machine image 216 may increase a launch time of the computing instance.

The various processes and/or other functionality contained within the system 200 may be executed on one or more processors 230 that are in communication with one or more memory modules 232. The system 200 may include a number of computing devices (e.g., physical hosts 236 and servers 204) that are arranged, for example, in one or more server banks or computer banks or other arrangements. The computing devices may support a computing environment using hypervisors, virtual machine monitors (VMMs) and other virtualization software. For example, the server 204 executing the launch time prediction module 218 may be implemented as a computing instance hosted on a physical host 236.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

In some examples, a customer may utilize a customer device 228 to request a launch of a computing instance and thereafter access the computing instance. A customer device 228 may include any device capable of sending and receiving data over a network 226. A customer device 228 may comprise, for example a processor-based system such as a computing device.

The network 226 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
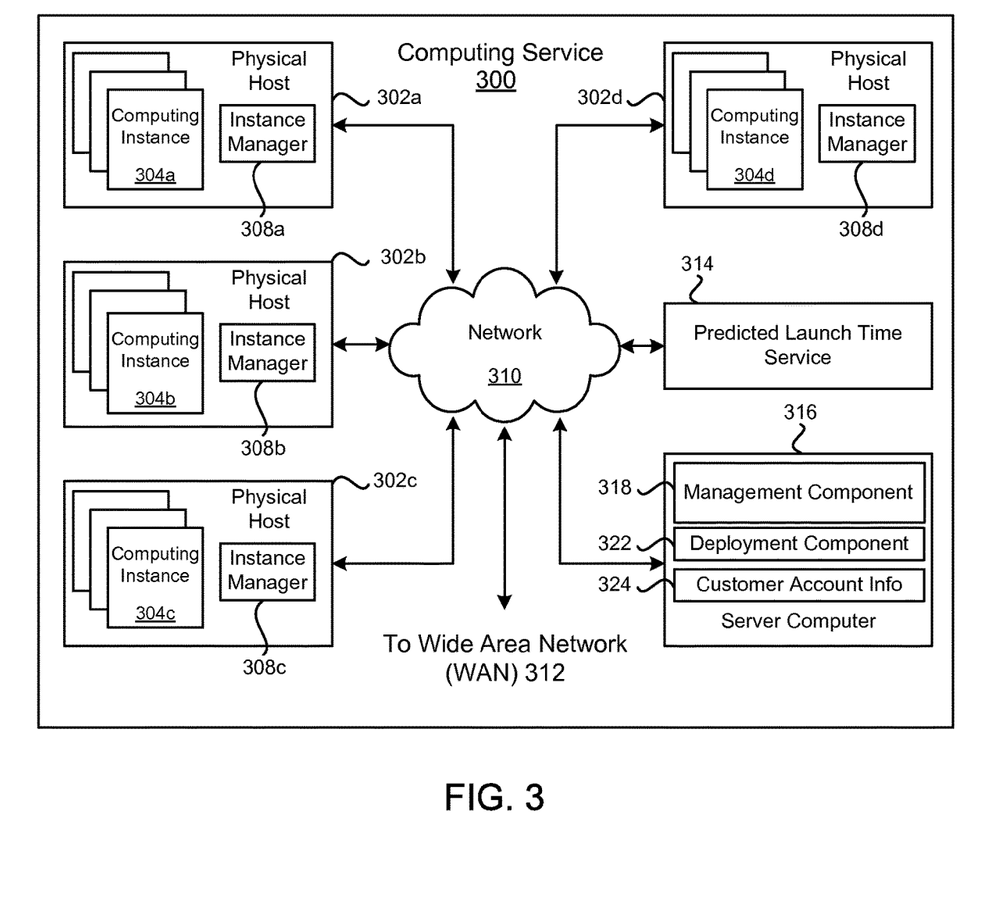
FIG. 3 is a block diagram that illustrates an example computing service environment that includes a predicted launch time service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of physical hosts 302a-d. While four physical hosts are shown, any number may be used, and large data centers may include thousands of physical hosts 302a-d. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the physical hosts 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single physical host. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a predicted launch time service that may respond to requests for a predicted launch time for a computing instance launched on a physical host 302a-d. For example, a request for a predicted launch time associated with a launch workflow may be made to the predicted launch time service.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300, the physical hosts 302a-d and the server computers 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
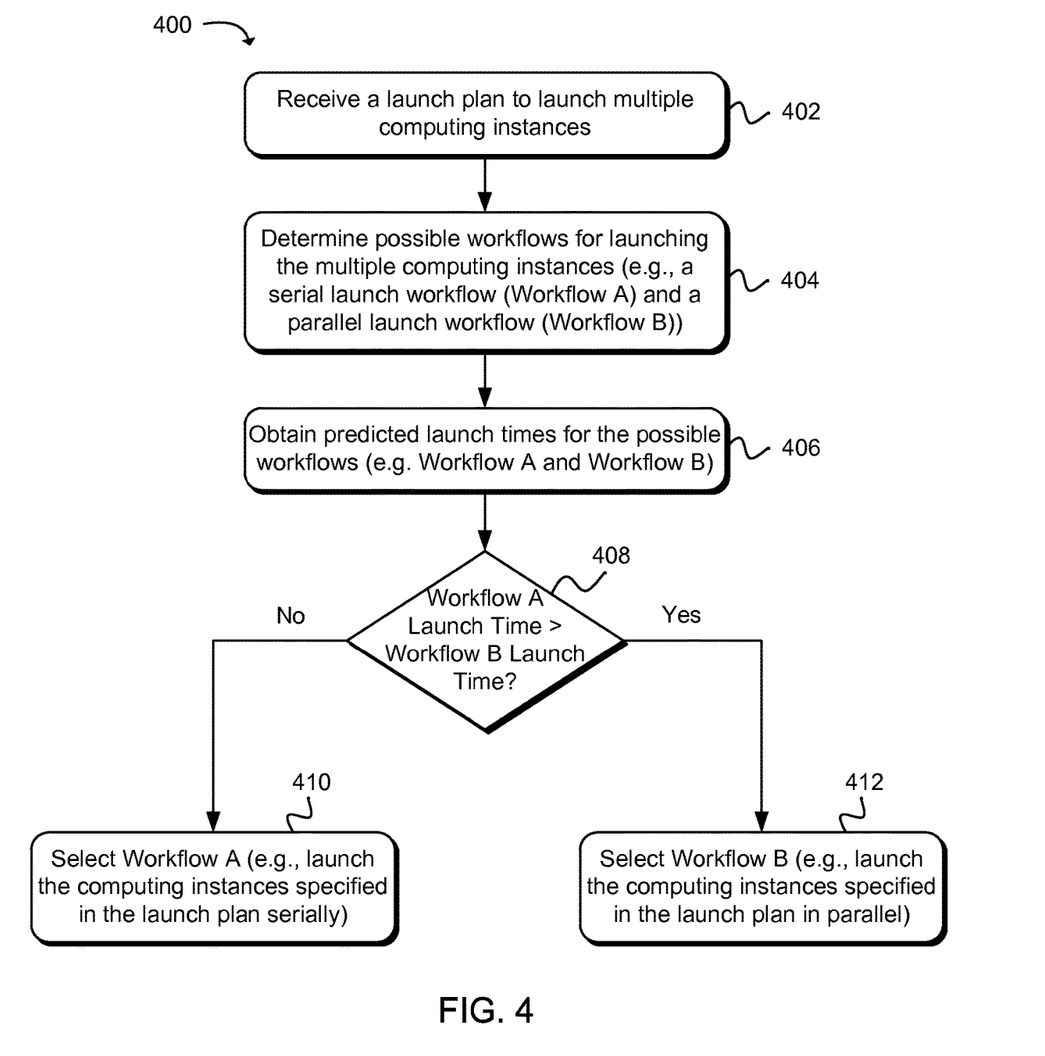
FIG. 4 is a flow diagram illustrating an example method for determining a launch workflow for a launch plan that includes multiple computing instances.

Moving now to FIG. 4, a flow diagram illustrates one example method 400 for determining a launch workflow for a launch plan that includes multiple computing instances. Beginning in block 402, a launch plan may be received specifying the launch of multiple computing instances (e.g., tens, hundreds or thousands of computing instances). In one example, a launch plan for multiple computing instances may be associated with a single customer. In another example, launch plans associated with multiple customers may be received resulting in the launch of multiple computing instances within a computing service environment. In either example, placement of the computing instances on physical hosts may result in co-location of computing instance launches on one or more physical hosts. For example, two or more computing instances may be placed on a physical host resulting in two or more pending launches on the physical host.

As in block 404, possible launch workflows used to launch multiple computing instances on a physical host may be determined. Possible launch workflows may include launching the multiple computing instances at one time (e.g., in parallel), launching computing instances one at a time (e.g., as one computing instance launch finishes, another computing instance launch is started), grouping the multiple computing instance launches into batches and launch the batches one at a time (e.g., as one batch finishes, another batch is launched), as well as other launch workflows that may be used to launch multiple computing instances.

As in block 406, predicted launch times for the possible launch workflows may then be obtained. In one example, after receiving the launch plan and determining possible launch workflows, predicted launch times may be requested for each of the possible launch workflows. As in block 408, the launch times may then be compared to determine a launch workflow used to execute the launch plan. As an illustration, a first launch workflow may specify that the computing instances be launched serially and a second launch workflow may specify that the computing instance be launched in parallel. Predicted launch times may be obtained for the first launch workflow and the second launch workflow and the predicted launch times may then be compared. As in block 410, in a case where the first predicted launch time may be less than the second predicted launch time, the first predicted launch time or first launch workflow may be selected (e.g., the computing instances may be launched serially on a selected physical host). As in block 412, in a case where the second predicted launch time may be less than the first predicted launch time, the second predicted launch time may be selected (e.g., the computing instances may be launched in parallel on the selected physical host).

In another example, a launch workflow may be specified in a launch configuration provided to a physical host selected to host multiple computing instances. The launch workflow specified in the launch configuration may be selected (e.g., via a control plane process, a physical host manager, etc.) upon receiving an associated launch plan by a computing service and included in the launch configuration provided to the physical host. After the physical host receives the launch configuration, a workflow module or service executing on the physical host may evaluate the launch workflow contained in the launch configuration by identifying alternative launch workflows that may be used to launch the computing instances. Predicted launch times may be obtained for the launch workflow specified in the launch configuration and for the alternative launch workflows, and the predicted launch times may then be compared to determine which launch workflow results in a reduced launch time.

In one example, a launch workflow associated with the lowest predicted launch time may be selected and used in launching computing instances on a physical host. In another example, a launch workflow associated with a predicted launch time that may be less than a target launch time may be selected and used in launching computing instances on a physical host.

In another example, after determining a launch workflow having the lowest predicted launch time as compared to predicted launch times for other launch workflows (e.g., a parallel launch workflow versus a serial launch workflow) for a launch request, the launch workflow may be analyzed to determine whether the predicted launch time for the launch workflow may be less than a target launch time for the launch request. In a case where the predicted launch time may not be less than the target launch time, the launch request may be placed in a priority launch queue. For example, the launch request may be placed in a priority launch queue resulting in computing instances included in the launch request to launch on a physical host prior to other pending launch requests.

In another example that includes a priority launch queue, a launch request may be assigned a fixed launch workflow (e.g., a parallel launch workflow) as determined by a customer or a computing service provider. As such, the launches of computing instances specified in the launch request are launched according to a sequence of operations specified by the launch workflow. The launch workflow may be analyzed to determine whether the launch request may be fulfilled within a target launch time associated with the launch request by obtaining a predicted launch time for the launch request. Where the launch request may not be fulfilled within the target launch time, the launch request may be placed in a priority queue allowing for the launch request to be performed prior to other pending launch requests.

Figure 5:
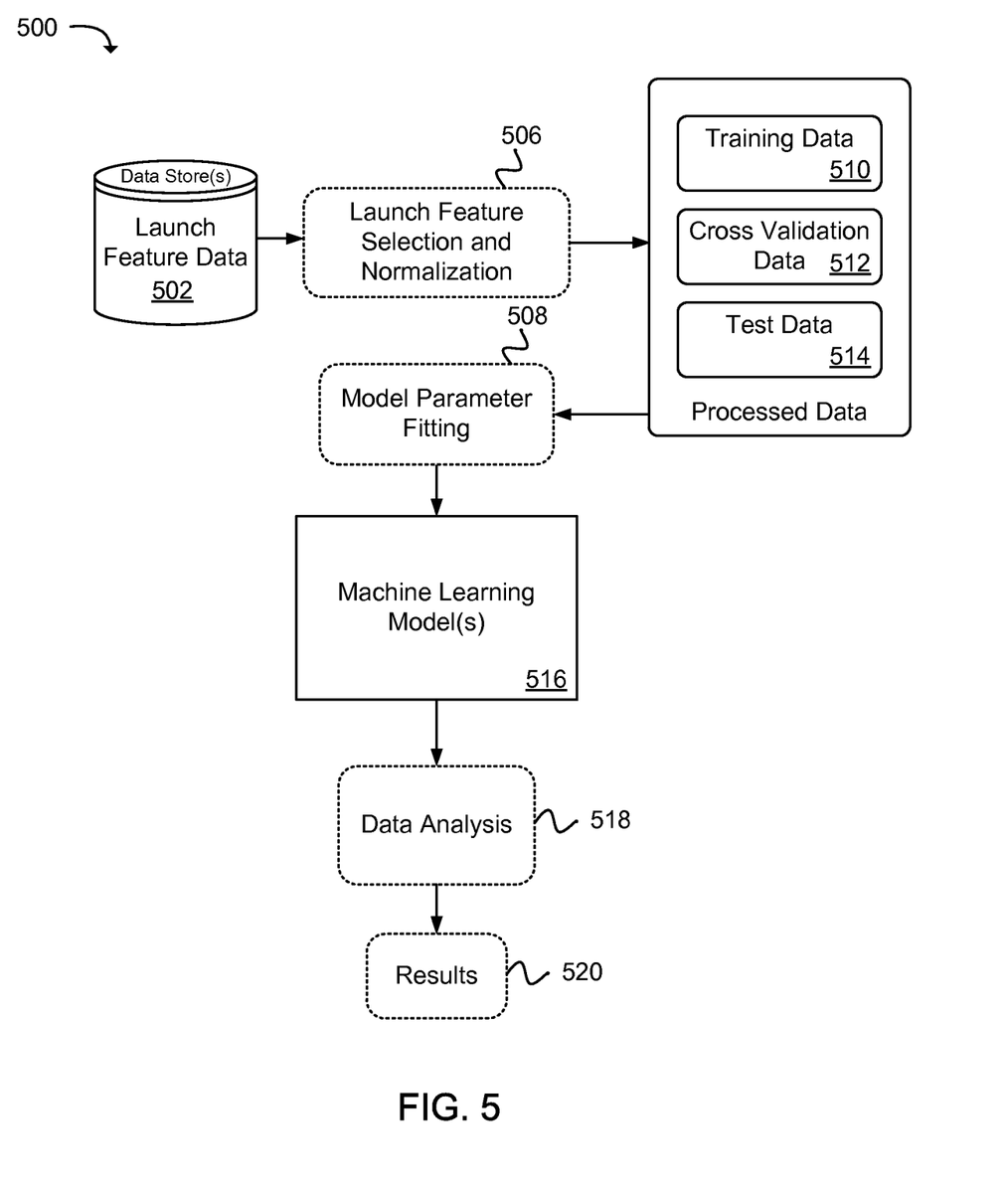
FIG. 5 is a diagram illustrating an example method for configuring and training a machine learning model used to generate a predicted launch time.

FIG. 5 is a flow diagram illustrating an example method 500 for configuring and training a machine learning model 516 used to generate a predicted launch time. As in block 506, launch feature selection may be performed by analyzing various computing instance launches to determine launch features that have an impact on a computing instance launch time. For example, various features of launching a computing instance on a physical host within a computing service environment, where the features are capable of being observed, may be identified.

Examples of launch features may include, but are not limited to: a number of contending computing instances on a physical host, an average, minimum and maximum number of running computing instances on a physical host, a count of running computing instances on a physical host at the start and the end of the computing instance launch, a machine image used to create a computing instance, a kernel image used by a computing instance, an architecture of a physical host, a virtualization type of a computing instance, a maximum number of computing instances that a physical host is capable of hosting, a percentage of occupancy of a physical host by computing instances at a start of a computing instance launch, a geographical region where a physical host is located, a hardware type of a physical host, a hardware vendor of a physical host, and an operating system, networking type, data store and size of a computing instance.

Launch features determined to have an impact on a launch time of a computing instance may be categorized. For example, categories of launch features may be based on various aspects of a computing instance launch. As an illustration, launch features may be categorized into machine image launch features, physical host launch features and customer configuration launch features.

In one example, identified launch features may be sorted or ranked according to an impact of a launch feature on a computing instance launch time and those launch features having the greatest impact on launch time may be selected as features to be used for predicting launch times. For example, launch features may be evaluated to determine a percentage of contribution that an individual launch feature has on a launch time. Launch features identified as having the greatest contribution on a launch time may be selected as input to a machine learning model. It should be noted that any number of launch features may be selected and the selection of the launch features may not be limited to just those launch features having the greatest impact on a launch time.

Having identified the launch features, launch feature data 502 for the launch features may then be obtained from data sources containing data associated with the launch features. As illustrated, launch feature data 502 may be obtained from a data store containing, for example, computing service management data, inventory data (e.g., physical host information), as well as other data associated with a computing service. The launch feature data 502 may be normalized enabling launch feature data 502 obtained from different data sources to be input into the machine learning model 516. The launch feature data 502 may be divided into training data 510, cross validation data 512 and test data 514. For example, a percentage of the launch feature data 502 may be randomly selected as test data 514 and cross validation data 512, and the remaining launch feature data 502 may be used as training data 510 to train the machine learning model 516.

The machine learning model 516 may be selected from among any available machine learning algorithm. In one example, a number of regression machine learning models may be tested to determine a machine learning model that provides an acceptable approximation of a launch time. One aspect of generating machine learning models may be, as in block 508, performing a parameter value search for machine learning parameters that result in a goodness-of-fit of the machine learning model 516 to the launch features. Machine learning parameters (i.e., parameters used to configure a machine learning model 516, such as setting a depth of a decision tree) may affect how a machine learning model 516 fits the training data 510. In one example, a distributed genetic algorithm may be used when a parameter space of a machine learning model 516 may be too large to perform a thorough parameter value search.

After selecting a machine learning model 516, the machine learning model 516 may be trained using the training data 510. The cross validation data 512 and the test data 514 may then be run through the machine learning model 516 to test whether the outputs of the machine learning model are representative for additional historical cases. Thereafter, as in block 518, data analysis may be performed to determine how well the machine learning model 516 was able to predict a launch time compared to an actual launch time. After testing two or more machine learning models 516, as in block 520, the results of the machine learning models 516 may be compared to identify the better performing machine learning model 516, which may then be selected and placed in a production environment.

Figure 6:
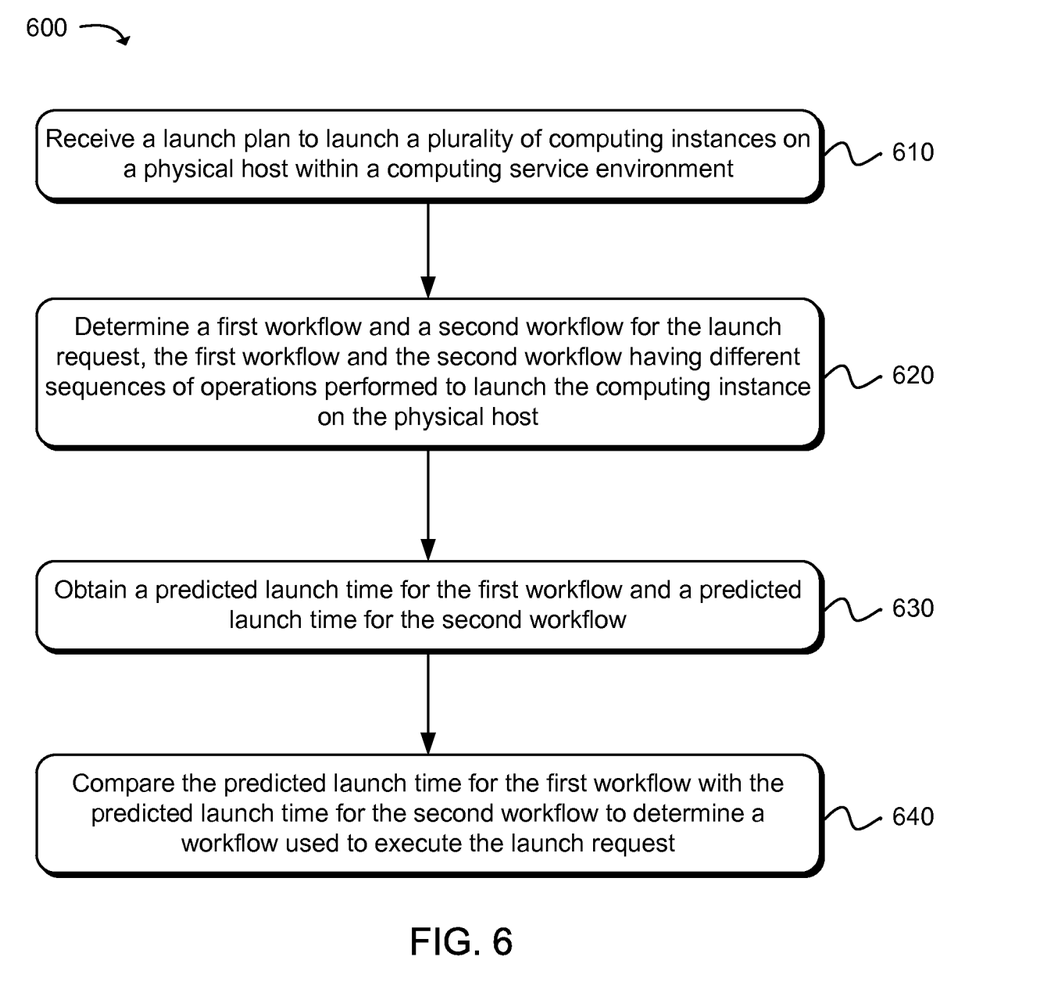
FIG. 6 is a flow diagram that illustrates an example method for determining a launch workflow used to perform a launch of multiple computing instances.

FIG. 6 is a flow diagram illustrating an example method 600 for determining a workflow used to perform a launch of multiple computing instances. Beginning in block 610, a launch plan to launch a plurality of computing instances on a physical host within a computing service environment may be received. For example, the launch plan may be for a number of computing instances in excess of a number of available physical hosts. As a result, there may not be a sufficient number of physical hosts within the computing service environment to launch each computing instance separately. Therefore, a number of computing instance launches may be co-located on a single physical host.

As in block 620, a first launch workflow and a second launch workflow may be determined for the launch plan, the first launch workflow and the second launch workflow having different sequences of operations performed to launch the computing instance on the physical host. One example of a launch workflow may be a workflow that queues a first launch for a first computing instance in a launch queue and executes a second launch for a second computing instance. Another example of a launch workflow may be a workflow that launches a first computing instance and a second computing instance in parallel. Another example launch workflow may include dividing a block of computing instance launches into smaller groups of computing instance launches and launching the groups of computing instances sequentially on a physical host. And yet another example launch workflow may include prioritizing computing instance launches according to target launch times. Other types of launch workflows that are not specifically mentioned here are also within the scope of this disclosure.

As in block 630, a predicted launch time for the first launch workflow and a predicted launch time for the second launch workflow may be obtained (or any number of predicted launch times for any number of launch workflows). The predicted launch time may be a time in which a computing instance is in a state of pending (i.e., executing service calls to setup computing instance resources, identifying a physical host to host the computing instance and creating the computing instance on the physical host) to a time in which the computing instance is in a state of executing (i.e., the start of booting the computing instance). It is noted that in some examples, a time in which a customer receives a usable computing instance (e.g., a booted computing instance) may be included in a predicted launch time by including a boot time for the computing instance.

In one example, obtaining a predicted launch time for the first launch workflow and a predicted launch time for the second launch workflow may be obtained using a machine learning model that receives data associated with launch features of a launch configuration and generates a predicted launch time. For example, launch features that may be determined to have an impact on launch time may include, but are not limited to: workflow launch features, machine image launch features (e.g., features for a machine image used to create the computing instance), physical host launch features (e.g., features of a physical host selected to host the computing instance) and launch configuration features that may be controlled by a customer (e.g., machine image configuration, geographic region, number of computing instances launched simultaneously, etc.). In one example, after obtaining the data associated with the launch features, the data may then be normalized.

The machine learning model may be trained using historical data and then placed in a production environment where the machine learning model receives active requests for predicted launch times. In one example configuration, the machine learning model may be periodically trained using historical data (e.g., prior day, week or month launch features). In another example configuration, the machine learning model may be trained by extracting launch features from active data (e.g., prior seconds, minutes, hours) and retraining the machine learning model while the machine learning model is in a production environment, thereby enabling the machine learning model to be adaptive to changes occurring within the computing service.

After obtaining predicted launch times generated by the machine learning model, as in block 640, the predicted launch time for the first launch workflow may be compared with the predicted launch time for the second launch workflow to determine a launch workflow used to execute the launch plan. In one example, a launch workflow (e.g., the first launch workflow) may be selected as a result of the launch workflow having a low predicted launch time compared to the predicted launch time for the other launch workflow (e.g., the second launch workflow). For example, a launch workflow may be selected that queues a first launch for a first computing instance in a launch queue and executes a second launch for a second computing instance as a result of the launch workflow having a faster predicted launch time as compared to a launch workflow that specifies executing the first launch and the second launch simultaneously. As another example, a launch workflow may be selected that launches the first computing instance and the second computing instance in parallel as a result of the launch workflow having a faster predicted launch time as compared to a launch workflow that specifies launching the first computing instance and the second computing instance in parallel.

Figure 7:
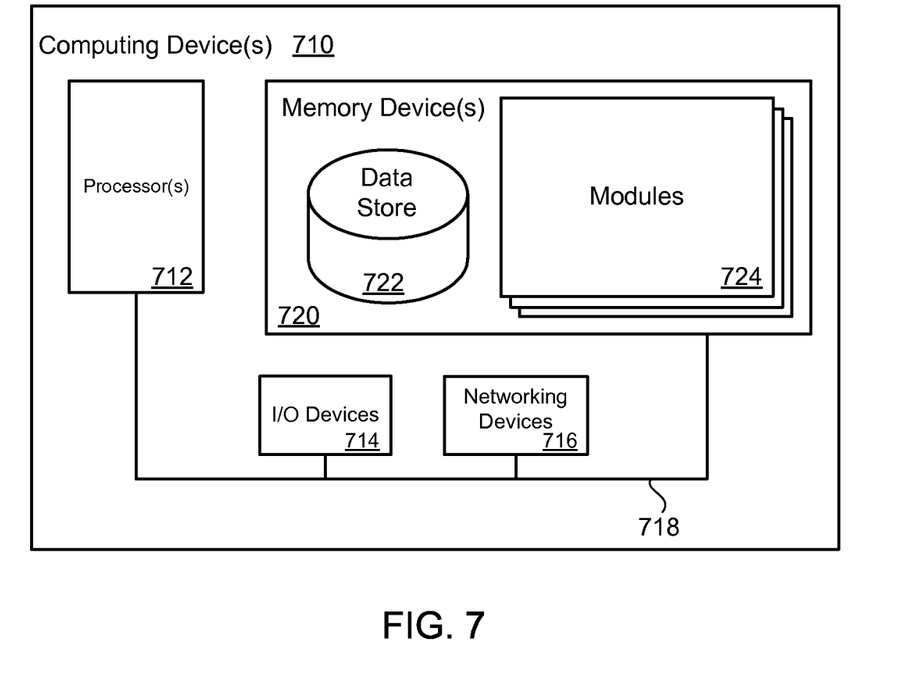
FIG. 7 is block diagram illustrating an example of a computing device that may be used to execute a method for determining a workflow used to perform a launch of multiple computing instances.

FIG. 7 illustrates a computing device 710 on which modules of this technology may execute. A computing device 710 is illustrated on which a high level example of the technology may be executed. The computing device 710 may include one or more processors 712 that are in communication with a plurality of memory devices 720. The computing device 710 may include a local communication interface 718 for the components in the computing device. For example, the local communication interface 718 may be a local data bus and/or any related address or control busses as may be desired.

A memory device 720 may contain modules 724 that are executable by the processor(s) 712 and data for the modules 724. For example, a memory device 720 may contain a launch time prediction module, a training module, a launch feature module and a launch workflow module. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:

receive a launch plan to launch a plurality of computing instances on a physical host within a computing service environment, the launch plan including a first launch workflow specifying a sequence of operations for launching the plurality of computing instances;

determine a second launch workflow for launching the plurality of computing instances on the physical host, wherein the second launch workflow is an alternative to the first launch workflow;

select launch features determined to have an impact on a launch time for the plurality of computing instances;

submit data associated with launch features of the launch plan to a machine learning model to produce predicted launch times for the plurality of computing instances, wherein the launch features include a feature representing launching the plurality of computing instances in parallel or launching the plurality of computing instances in sequence;

obtain predicted launch times for the first launch workflow included in the launch plan and for the second launch workflow from the machine learning model;

compare the predicted launch time for the first launch workflow with the predicted launch time for the second launch workflow to determine a launch workflow to execute the launch plan and reduce launch time; and cause the plurality of computing instances to be launched using the launch workflow determined to execute the launch plan and reduce launch time.

2. A non-transitory machine readable storage medium as in claim 1, wherein instructions that when executed by the processor further select a launch workflow having a lower predicted launch time compared to the predicted launch times obtained and launch the plurality of computing instances on the physical host according to the launch workflow selected.

3. A non-transitory machine readable storage medium as in claim 1, wherein instructions that when executed by the processor further select launch features determined to have an impact on a launch time of the at least one computing instance from: workflow launch features, machine image launch features, physical host launch features and customer configuration launch features, wherein the launch features provided to the machine learning model comprise at least one: features of a machine image used to launch a computing instance, features of host servers used to host the computing instance, or features of a computing instance attachment that is attached to the computing instance when launched.

4. A computer implemented method, comprising:

under control of one or more computer systems configured with executable instructions, receiving a launch plan to launch a plurality of computing instances on a physical host within a computing service environment;

determining a first launch workflow and a second launch workflow for the launch plan, using one or more processors of the computer systems, the first launch workflow and the second launch workflow having different sequences of operations performed to launch the computing instance on the physical host;

obtaining a predicted launch time for the first launch workflow and a predicted launch time for the second launch workflow, using a machine learning model that receives data associated with launch features, wherein the launch features include a feature representing launching the plurality of computing instances in parallel or launching the plurality of computing instances in sequence;

comparing the predicted launch time for the first launch workflow with the predicted launch time for the second launch workflow to determine a workflow used to execute the launch plan, using the one or more processors of the computing systems; and causing the plurality of computing instances to be launched using the workflow determined to execute the launch plan and reduce launch time.

5. A method as in claim 4, further comprising selecting the first launch workflow as a result of the first launch workflow having a lower predicted launch time compared to the predicted launch time for the second launch workflow.

6. A method as in claim 4, wherein the launch features are associated with a launch configuration of the plurality of computing instances and are used to generate the predicted launch time, wherein the launch features provided to the machine learning model comprise at least one: features of a machine image used to launch a computing instance, features of host servers used to host the computing instance, or features of a computing instance attachment that is attached to the computing instance when launched.

7. A method as in claim 4, wherein receiving the launch plan to launch a computing instance further comprises:

receiving a launch plan to launch a first computing instance and a second computing instance; and selecting a launch workflow that queues a first launch for a first computing instance in a launch queue and executes a second launch for a second computing instance as a result of the launch workflow having a faster predicted launch time as compared to a launch workflow that specifies executing the first launch and the second launch simultaneously.

8. A method as in claim 4, wherein receiving the launch plan to launch a computing instance further comprises:

receiving a launch plan to launch a first computing instance and a second computing instance; and selecting a launch workflow that launches the first computing instance and the second computing instance in parallel as a result of the launch workflow having a faster predicted launch time as compared to a launch workflow that specifies launching the first computing instance and the second computing instance in parallel.

9. A method as in claim 4, further comprising identifying a target launch time associated with the launch plan and selecting the first launch workflow as a result of the first launch workflow having a predicted launch time that is less than the target launch time.

10. A method as in claim 4, further comprising identifying an target launch time associated with the launch plan; and placing the launch plan in a priority launch queue as a result of the predicted launch time for the first launch workflow being greater than the target launch time.

11. A method as in claim 4, further comprising normalizing the data associated with the launch features prior to inputting the data to the machine learning model.

12. A method as in claim 4, further comprising performing a parameter value search for machine learning parameters that result in a goodness-of-fit of the machine learning model to the launch features provided to the machine learning model.

13. A method as in claim 12, wherein performing the parameter value search further comprises, performing a parameter value search for machine learning parameters using a distributed genetic algorithm.

14. A method as in claim 4, further comprising obtaining active training data associated with the launch features representing features for a plurality of previous computing instance launches;

obtaining features from the active training data associated with the features; and training the machine learning model using the features.

15. A method as in claim 4, wherein inputting the launch features to a machine learning model further comprises inputting the launch features to a machine learning model selected from one of: a random forest model, an extremely randomized trees model, an AdaBoost model, a stochastic gradient descent model or a support vector machine model.

16. A method as in claim 4, wherein inputting the launch features to a machine learning model further comprises, inputting the launch features to a machine learning regression model.

17. A system comprising:
a processor;
a memory device including instructions that, when executed by the processor, cause the system to:
receive a launch plan to launch a plurality of computing instances on a physical host within a computing service environment, the launch plan specifying a launch workflow for launching the plurality of computing instances;
identify a target launch time associated with the launch plan;
obtain a predicted launch time for the launch workflow specified in the launch plan using a machine learning model, using a machine learning model that receives data associated with launch features, wherein the launch features include a feature representing launching the plurality of computing instances in parallel or launching the plurality of computing instances in sequence, and features of a computing instance attachment that is attached to the computing instance when launched;
place the launch plan in a priority launch queue as a result of the predicted launch time for the launch workflow being greater than the target launch time; and
cause the plurality of computing instances to be launched using the launch workflow with the target launch time.

18. A system as in claim 17, wherein the memory device includes instructions that, when executed by the processor, cause the system to place the launch plan in the priority launch queue resulting in launching computing instances specified in the launch plan prior to computing instances specified in launch plans placed in a non-priority launch queue.

19. A system as in claim 17, wherein the memory device includes instructions that, when executed by the processor, cause the system to input the launch features representing features for a plurality of previous computing instance launches to the machine learning model, wherein the launch features provided to the machine learning model comprise at least one: features of a machine image used to launch a computing instance, features of host servers used to host the computing instance, or features of a computing instance attachment that is attached to the computing instance when launched.

* * * * *